Patented Dec. 22, 1953

2,663,648

UNITED STATES PATENT OFFICE 2,663,648

THERMALLY STABLE BITUMINOUS BONDING COMPOSITIONS

Murray Jelling, Brooklyn, N. Y.

No Drawing. Application November 21, 1950, Serial No. 196,929

13 Claims. (Cl. 106—273)

This invention relates to bituminous bonding compositions which may be used, for example, as bonding agents for bonding mineral aggregates in the construction of asphalt pavements. More particularly, the invention relates to bituminous compositions that have incorporated therein certain additives which improve the bonding effectiveness of the bituminous compositions and are also thermally stable at the elevated temperatures to which the bituminous composition is customarily subjected during processing. In accordance with this invention, bituminous paving compositions have incorporated therein small amounts of N-dialkylaminoalkylamides or their carboxylic acid salts.

During the development of the art of improving the coating and bonding qualities of bituminous compositions when mixed with mineral aggregates in the construction of asphalt pavements, several types of chemical agents have been proposed and used. The use of these agents has made it possible to use wet aggregates in preparing paving mixtures, thereby obviating the necessity of having available dry aggregates. Thus, attendant delays in road construction have been eliminated. Also, the incorporation of bonding agents has permitted the use of hydrophilic aggregates, which could not otherwise be employed. In addition the incorporation of these chemical bonding agents has brought about an improvement in the structural stability of the finished bituminous pavement by increasing the resistance to separation of aggregate and bitumen caused by the detrimental action of water.

Thus, these agents have been useful in improving the method of asphalt road construction and in improving the quality and length of service of the finished pavement.

Chemical bonding agents of several types have been proposed and used, such as metallic soaps, fatty acids, surface active amines, amine soaps, and acylamidoamines and their soaps. The most useful, from the point of view of effectiveness, ease of application, and cost, have been those based on compositions of surface active organic amines such as described in patents to Louis A. Mikeska: No. 2,389,680, issued November 27, 1945; and James M. Johnson, Francis L. Mark and Murray Jelling: No. 2,514,954, issued July 11, 1950. The value of bonding agents, such as aminoalkylamides, polyaminoalkylamides, and their carboxylic acid salts, has been fully demonstrated in improving the coating of wet aggregates, bonding of bituminous materials to aggregates, and improving the long range stability of finished pavements by increasing the resistance to separation of aggregate and bitumen in the presence of water.

In many instances it is common practice to store the bituminous composition in tanks at an elevated temperature, 250–400° F., and maintain a fluid state, so that the composition may be readily removed without reheating, which would be necessary if the bituminous composition were allowed to cool and solidify. The period of storage may be as long as 14 days. As required, the asphalt is withdrawn and handled as is or mixed with hydrocarbon diluents in preparing cutback asphalts.

In other instances, quantities of asphalt or like bitumen are heated as high as 400–500° F. at the time of shipment so that its temperature upon arrival at the point of destination will have dropped to about 300–350° F., which is the desirable temperature required for proper application in preparing the paving mixture.

It has recently become apparent that many conventional types of bonding agents lose their effectiveness in a very short time when subjected to these high temperatures, i. e., temperatures in the range normally encountered with the storing and handling of bituminous materials. When the above described bonding agents are subjected to these high temperature conditions, their effectiveness is consequently lost in a short time and they are of little value as bonding agents.

As an example of this loss of effectiveness, samples of penetration grade asphalts containing a sufficient quantity of bonding agent to produce the desired coating, bonding, and resistance to the stripping action of water, were maintained at 325° F. for 24 hours. When paving mixtures were made, allowed to cure, and then immersed in water, the lack of resistance to stripping was readily apparent as compared to similar preparations, where the treated asphalts were not subjected to a high temperature, but were used in preparing the paving mixtures immediately after adding the bonding agent. As another example, when the treated penetration asphalts, after maintaining at 325° F. for 24 hours, were converted to cutback asphalts by adding petroleum naphtha, they were ineffective in coating wet stone and forming durable bonds with aggregates. By comparison, similarly treated samples, not subjected to the prolonged high temperature, upon conversion to cutback asphalts in a similar manner, were effective in coating wet stone, forming durable bonds with aggregates, and resisting the stripping action of water upon immersion of the paving mixtures in water.

It has now been found that N-dialkylaminoalkylamides and their carboxylic acid salts, the latter which are believed to be new compounds, are extremely effective bituminous bonding agents. In addition the compounds of this invention do not suffer from any of the above-cited disadvantages of conventional bonding agents, i. e., their bonding action is unaffected by the high temperatures encountered during normal processing operations.

Suitable N-dialkylaminoalkylamide compounds of the indicated type are illustrated in the following formula:

$$RCO-NR'-A-NR''_2$$

where RCO— represents an acyl group derived from a carboxylic acid, i. e., from a fatty acid containing 10 to 20 carbon atoms or from a rosin acid; A represents an alkylene group containing 2 to 6 carbon atoms; R' represents a hydrogen atom or an alkyl group containing 1 to 4 carbon atoms and R'' represents an alkyl group containing 1 to 4 carbon atoms, where each R'' may be the same or different.

Particularly effective and desirable compounds of the class of compounds of this invention are: $C_{17}H_{33}CONHCH_2CH_2CH_2N(CH_3)_2$ named N-dimethylaminopropyl oleamide and $$C_{17}H_{33}CONHCH_2CH_2N(CH_3)_2$$

named N-dimethylaminoethyl oleamide. Among the other particular compounds of this class of compounds are: $C_{11}H_{23}CONHCH_2CH_2N(C_4H_9)_2$ named N-dibutylaminoethyl lauramide, $$C_{17}H_{31}CON(CH_3)C_6H_{12}N(C_2H_5)_2$$

named N-methyl-N-diethylaminohexyl linoleamide and $C_{17}H_{33}CON(C_3H_7)CH_2CH_2N(CH_3)C_3H_7$ named N-isopropyl-N-methylisopropylaminoethyl oleamide.

The invention also relates to thermally stable, surface active carboxylic acid salts of N-dialkylaminoalkylamides as represented by the formula:

$$RCO-NR'-A-NR''_2.HO-OCR$$

wherein RCO—, R', R'', and A represent the same groups as described previously. The RCO— in these types of compounds may be the same or different.

The following are particularly effective and desirable examples of this class of bituminous bonding agents: $C_{17}H_{33}CONHCH_2CH_2N(CH_3)_2.HOOCR$ named the rosin acids salts of N-dimethylaminoethyl oleamide and $$C_{17}H_{33}CONHCH_2CH_2CH_2N(CH_3)_2.HOOCR$$

named the rosin acids salts of N-dimethylaminopropyl oleamide. Among the other particular compounds of this class of compounds are:

$$C_{11}H_{23}CONHCH_2CH_2CH_2N(C_3H_7)_2.HOOCC_{17}H_{33}$$

named N-diisopropylaminopropyl lauramide oleate, $C_{17}H_{31}CON(CH_3)CH_2CH_2N$
$(CH_3)C_3H_7.HOOCC_{11}H_{23}$ named N-methyl-N-methylisopropylaminoethyl linoleamide laurate, and $$C_{17}H_{33}CON(C_4H_9)C_4H_8N(C_4H_9)_2.HOOCC_{17}H_{33}$$

named N-butyl-N-dibutylaminobutyl oleamide oleate.

It should be noted that both types of compounds contain a tertiary amine group and an amide group and it is this particular structure which is believed to impart to the compounds their desired characteristics.

In preparing the N-dialkylaminoalkylamides and their carboxylic acid salts, organic acids are reacted with dialkylaminoalkylamines. Representatives of the class of these amines are:

$$(CH_3)_2NCH_2CH_2CH_2NH_2$$

named 3-dimethylaminopropylamine, $$(CH_3)_2NCH_2CH_2NH_2$$

named dimethylaminoethylamine, $$(CH_3)_2NCH_2CH_2NHCH_3$$

named dimethylaminoethyl methylamine, $$(C_4H_9)_2NCH_2CH_2CH_2CH_2NHC_4H_9$$

named 4-dibutylaminobutyl butylamine, and $$C_3H_7(CH_3)NCH_2CH_2NHCH_3$$

named methylisopropylaminoethyl methylamine.

Representative of the organic acids that may be used are oleic, linoleic, linolenic, lauric, palmitic, stearic, rosin acids, abietic acid, the mixed acids of tall oil, or mixtures of any of these acids. Triglycerides, such as vegetable and fish oils and animal fats, may be used as ingredients to supply the fatty acids required in carrying out the chemical preparation.

In preparing the N-dialkylaminoalkylamides, one mol of organic acid and one mol of dialkylaminoalkylamine are mixed together and heated at 100–200° C. in a suitable container with suitable agitation. Upon mixing, the amine salt of the organic acid is formed and during the heating process the salt is molecularly dehydrated forming one mol of the N-dialkylaminoalkylamide with the elimination of one mol of water, as follows:

Reaction on mixing:

$RCOOH + NHR'-A-NR''_2 \rightarrow$
$\qquad RCOOH.NHR'-A-NR''_2 \quad (1)$ and $RCOOH + NHR'-A-NR''_2 \rightarrow$
$\qquad RCOOH.NR''_2-A-NHR' \quad (2)$ Reaction upon heating:

$(1) \rightarrow RCO-NR'-A-NR''_2 + H_2O$
$(2) \rightarrow (1) \rightarrow RCO-NR'-A-NR''_2 + H_2O$ The course of the reaction and its completion may be followed by noting the diminishing proportion of carboxylic acid by titration with standard alkali and the diminishing proportion of titratable amino with standard acid. At the completion of the reaction there is substantially no organic acid present and the titratable alkali has been reduced to substantially one-half of its original value. The measurement of the eliminated water may also be useful as a guide in determining the completion of the reaction.

In preparing the carboxylic acid salts of the N-dialkylaminoalkylamides, equimolecular proportions of the N-dialkylaminoalkylamide and the organic acid are mixed together at any suitable temperature at which the components are liquids:

$RCO-NR'-A-NR''_2 + RCOOH \rightarrow$
$\qquad RCO-NR'-A-NR''_2.HOOCR$

Alternatively, all reactions may be carried out concurrently by mixing one mol of dialklylaminoalkylamine and two mols of organic acid and reacting the mixture at 100–200° C. in a suitable container with suitable agitation:

$2RCOOH + NHR'-A-NR''_2 \rightarrow$
$\qquad RCOOH.NHR'-A-NR''_2.HOOCR \quad (1)$ $(1) \rightarrow RCO-NR'-A-NR''_2.HOOCR + H_2O$ The following examples illustrate this invention and include both the preparation of the compounds of this invention and test results on their use as thermally stable bituminous bonding agents.

Example 1

One mol of dimethylaminoethylamine and one mol of oleic acid were mixed and heated slowly to 150° C. and maintained at 150° C. with constant agitation for 4 hours. The resulting product, $C_{17}H_{33}CONHCH_2CH_2N(CH_3)_2$, was thermally stable when added to bituminous compositions and maintained at elevated temperatures. The product may also be mixed in equimolecular proportions with oleic acid, the mixed acids of tall oil, or rosin acids forming the corresponding organic acid salt of N-dimethylaminoethyl oleamide which is also a thermally stable bonding agent when mixed with bituminous paving materials and maintained at elevated temperatures.

Example 2

One mol of diethylaminoethylamine and two mols of oleic acid were reacted as in Example 1. The resulting product, the oleic acid salt of N-diethylaminoethyl oleamide, $$C_{17}H_{33}CONHCH_2CH_2N(C_2H_5)_2 \cdot HOOCC_{17}H_{33}$$

was a thermally stable bituminous bonding agent.

Example 3

One mol of 3-dimethylaminopropylamine and two mols of tall oil were reacted as in Example 1. The resulting product, consisting principally of the rosin acids salts of N-dimethylaminopropyl oleamide, N-dimethylaminopropyl linoleamide, and N-dimethylaminopropyl linolenamide, was a thermally stable, surface active bituminous bonding agent which maintained its effectiveness when dispersed in asphalt and like compositions and maintained at temperatures of 300–500° F. for 14 days.

Example 4

One mol of 3-diisopropylaminopropylamine and one-third mol of cocoanut oil were mixed and heated at 150° C. for two hours. The reaction resulted in the formation of the N-diisopropylaminopropylamides of the mixed fatty acids of cocoanut oil and glycerol. The product is a thermally stable bonding agent and the entire reaction product may be utilized in its impure state or the glycerol may be separated. In addition, the product may be mixed with one mol of fatty acids or rosin acids to form the carboxylic acid salts of the mixed N-diisopropylaminopropylamides.

Example 5

As an example of the thermal stability of these products, one part of the product made in Example 3 was mixed with 100 parts of asphalt cement at a temperature of 325° F. and maintained at this temperature for seven days. At the end of this period the asphalt cement was mixed with petroleum naphtha in the proper proportion to convert it to a cutback asphalt designated as RC-2. When this was mixed with wet aggregate to form a paving composition, the cutback asphalt readily coated all of the aggregate particles and, upon curing, formed a strong bond throughout the mixture. When subjected to the detrimental action of water, the paving mixture was found to be resistant to separation of the bitumen from the aggregate particles.

These compositions as bituminous bonding agents may be utilized with any type of thermoplastic bituminous material, such as petroleum derived asphalts, tars, natural asphalts, road oils, asphalt and tar cutbacks prepared with hydrocarbon diluents and pitches obtained from all types of distillation or extraction residues. These surface active agents are readily dispersed in bituminous materials when all components are in the fluid state. For effective coating of wet aggregates with the treated bituminous composition, the thermally stable, surface active agent is added in the proportion of approximately 0.1–2.0 parts by weight to 100 parts of bituminous material.

In paving compositions all types of aggregates may be used, such as gravel, crushed stone, sand, or slag in either wet or dry condition. These agents are also useful in the coating and bonding of other types of surfaces with bituminous compositions, such as metal, glass, wood, ceramics, plastics, and paper, particularly when wet or when the material may be subjected to the deleterious action of water causing a loss in strength of the bituminous bond.

It is to be understood that the invention is not limited to the specific examples which have been offered merely as illustrations, since other derivatives can be prepared, and that modifications may be made without departing from the spirit of the invention.

I claim:

1. A bituminous composition containing a thermally stable bonding agent selected from the group consisting of N-dialkylaminoalkylamides corresponding to the general formula:

$$RCO-NR'-A-NR''_2$$

and their carboxylic acid salts corresponding to the general formula:

$$RCO-NR'-A-NR''_2 \cdot HO-OCR$$

where RCO— is an acyl group derived from a carboxylic acid selected from the group consisting of $C_{12}$–$C_{20}$ fatty acids and rosin acids; A is an alkylene group containing from 2 to 6 carbon atoms; R' is a radical selected from the group consisting of hydrogen and alkyl radicals containing from 1 to 4 carbon atoms; and R'' is an alkyl group containing 1 to 4 carbon atoms.

2. A composition as in claim 1 in which the thermally stable agent is present in an amount of from approximately 0.1 to 2.0 parts by weight per 100 parts of bituminous material.

3. A bituminous paving composition containing as a thermally stable bonding agent a N-dialkylaminoalkylamide corresponding to the general formula:

$$RCO-NR'-A-NR''_2$$

where RCO— is an acyl group derived from a carboxylic acid selected from the group consisting of $C_{12}$–$C_{20}$ fatty acids and rosin acids; A is an alkylene group containing from 2 to 6 carbon atoms; R' is a radical selected from the group consisting of hydrogen and alkyl radicals containing from 1 to 4 carbon atoms; and R'' is an alkyl group containing 1 to 4 carbon atoms.

4. A bituminous paving composition containing as a thermally stable bonding agent a carboxylic acid salt corresponding to the general formula:

$$RCO-NR'-A-NR''_2 \cdot HO-OCR$$

where RCO— is an acyl group derived from a higher carboxylic acid selected from the group consisting of $C_{12}$–$C_{20}$ fatty acids and rosin acids;

A is an alkylene group containing from 2 to 6 carbon atoms; R' is a radical selected from the group consisting of hydrogen and alkyl radicals containing from 1 to 4 carbon atoms; and R'' is an alkyl group containing from 1 to 4 carbon atoms.

5. A paving composition as in claim 3 wherein the thermally stable bonding agent is N-dimethylaminopropyl oleamide:

$$C_{17}H_{33}CONHCH_2CH_2CH_2N(CH_3)_2$$

6. A paving composition as in claim 4 wherein the thermally stable bonding agent is the rosin acids salts of N-dimethylaminoethyl oleamide corresponding to the formula:

$$C_{17}H_{33}CONHCH_2CH_2N(CH_3)_2$$

7. A paving composition as in claim 4 wherein the thermally stable bonding agent is the rosin acids salts of N-dimethylaminopropyl oleamide corresponding to the formula:

$$C_{17}H_{33}CONHCH_2CH_2CH_2N(CH_3)_2$$

8. A composition as in claim 3 in which the RCO— acyl group is derived from a fatty acid containing from 12 to 20 carbon atoms.

9. A composition as in claim 3 in which the RCO— acyl group is derived from a rosin acid.

10. A composition as in claim 3 in which the RCO— acyl group is derived from tall oil.

11. A composition as in claim 4 in which the RCO— acyl group is derived from a fatty acid containing from 12 to 20 carbon atoms.

12. A composition as in claim 4 in which the RCO— acyl group is derived from a rosin acid.

13. A composition as in claim 4 in which the RCO— acyl group is derived from tall oil.

MURRAY JELLING.

References Cited in the file of this patent

UNITED STATES PATENTS

| Number | Name | Date |
|---|---|---|
| 1,534,525 | Hartmann et al. | Apr. 21, 1925 |
| 1,677,554 | Gams | July 17, 1928 |
| 2,075,230 | Schatz | Mar. 30, 1937 |
| 2,146,408 | Shipp | Feb. 7, 1939 |
| 2,238,021 | Jane | Apr. 8, 1941 |
| 2,268,395 | Henke | Dec. 30, 1941 |
| 2,312,387 | Christmann | Mar. 2, 1943 |
| 2,371,736 | Carson | Mar. 20, 1945 |
| 2,384,063 | Auer | Sept. 4, 1945 |
| 2,389,680 | Mikeska | Nov. 27, 1945 |
| 2,426,220 | Johnson | Aug. 26, 1947 |
| 2,438,318 | Johnson | Mar. 23, 1948 |
| 2,514,954 | Johnson | July 11, 1950 |
| 2,520,720 | Harman | Aug. 29, 1950 |
| 2,523,934 | Albrecht | Sept. 26, 1950 |